United States Patent
Wilson et al.

(10) Patent No.: US 10,829,619 B2
(45) Date of Patent: Nov. 10, 2020

(54) ZINC-RICH COATINGS AND SYSTEMS WITH MICROENCAPSULATED HEALING AGENTS

(71) Applicant: Autonomic Materials, Inc., Champaign, IL (US)

(72) Inventors: Gerald O. Wilson, Champaign, IL (US); Subramanyam V. Kasisomayajula, Champaign, IL (US); Christopher R. D. Dayton, Champaign, IL (US)

(73) Assignee: Autonomic Materials, Inc., Champaign, IL (US)

( * ) Notice: Subject to any disclaimer, the term of this patent is extended or adjusted under 35 U.S.C. 154(b) by 105 days.

(21) Appl. No.: 15/948,708

(22) Filed: Apr. 9, 2018

(65) Prior Publication Data

US 2019/0270865 A1 Sep. 5, 2019

Related U.S. Application Data

(60) Provisional application No. 62/637,346, filed on Mar. 1, 2018.

(51) Int. Cl.

| | |
|---|---|
| *C08K 9/10* | (2006.01) |
| *C09D 7/61* | (2018.01) |
| *C09D 7/40* | (2018.01) |
| *C09D 5/12* | (2006.01) |
| *C08K 5/5435* | (2006.01) |
| *C23C 28/00* | (2006.01) |
| *C09D 163/00* | (2006.01) |
| *C09D 5/10* | (2006.01) |
| *C09D 5/00* | (2006.01) |
| *C23C 30/00* | (2006.01) |

(52) U.S. Cl.
CPC ............. *C08K 9/10* (2013.01); *C08K 5/5435* (2013.01); *C09D 5/002* (2013.01); *C09D 5/106* (2013.01); *C09D 5/12* (2013.01); *C09D 7/61* (2018.01); *C09D 7/69* (2018.01); *C09D 163/00* (2013.01); *C23C 28/00* (2013.01); *C23C 30/00* (2013.01); *C08K 2201/005* (2013.01)

(58) Field of Classification Search
None
See application file for complete search history.

(56) References Cited

U.S. PATENT DOCUMENTS

| | | | |
|---|---|---|---|
| 2007/0166542 A1 | 7/2007 | Braun et al. | |
| 2012/0207921 A1* | 8/2012 | Calle | B01J 13/14 427/140 |
| 2013/0017405 A1 | 1/2013 | Benkoski et al. | |
| 2014/0242393 A1* | 8/2014 | Olmeijer | B05D 7/54 428/413 |

(Continued)

*Primary Examiner* — Jeffrey D Washville
(74) *Attorney, Agent, or Firm* — Schwabe, Williamson & Wyatt, P.C.

(57) ABSTRACT

Microencapsulated healing agents that, upon incorporation into a zinc-rich coating or coating system, improve the coating or coating system's ability to maintain its adhesion and corrosion resistance after damage that exposes the underlying substrate. These microencapsulated healing agent formulations are uniquely synergistic with zinc-rich coatings, and/or with zinc particles in a zinc rich coating, improving both adhesion maintenance and corrosion resistance following damage that exposes the substrate.

19 Claims, 12 Drawing Sheets

(56) References Cited

U.S. PATENT DOCUMENTS

2014/0371362 A1* 12/2014 Wilson .................. C09J 167/08
524/287
2018/0037749 A1    2/2018 Wilson et al.

* cited by examiner

Rating Scale: 0 – Worst; 10 – Best.

Rating Scale: 0 – Worst; 10 – Best.

ZINC-RICH COATINGS AND SYSTEMS WITH MICROENCAPSULATED HEALING AGENTS

CROSS REFERENCE TO RELATED APPLICATION

The present application claims priority to U.S. Provisional Patent Application No. 62/637,346, titled "IMPROVED ZINC-RICH PRIMERS VIA MICROENCAPSULATED HEALING AGENTS," filed Mar. 1, 2018, the disclosure of which is hereby incorporated by reference in its entirety.

TECHNICAL FIELD

Embodiments relate to coatings, such as self-healing coatings and coating systems that provide corrosion protection.

BACKGROUND

Coating systems that include zinc-rich primers are used to protect steel substrates in some of the most corrosive environments. However, like all coatings, damage can cause the underlying substrate to become exposed to the environment, rendering it susceptible to corrosion and moisture penetration. Once started, corrosion propagates at the coating-substrate interface, leading to undercutting and loss of adhesion. In instances where corrosion on the substrate may not be yet prevalent, moisture ingress also leads to loss of adhesion. With loss of adhesion, the coating's ability to protect the underlying substrate is significantly impaired.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 2A), and a standard organic zinc-rich primer that incorporates a microencapsulated healing agent (FIG. 2B), in accordance with various embodiments;

FIG. 3A), and a standard organic zinc-rich primer incorporating microencapsulated healing agent with an epoxy-based second layer (FIG. 3B), in accordance with various embodiments;

FIG. 6A), comparative formulation V2 (version 2; FIG. 6B), and comparative formulation V4 (version 4; FIG. 6C) in two-coat evaluations with an epoxy-based build coat applied as shown in FIG. 3, in accordance with various embodiments;

FIG. 9A), an epoxy build coat and polyurethane top coat, and a standard organic zinc-rich primer incorporating microencapsulated healing agent, an epoxy build coat, and a polyurethane top coat (FIG. 9B), in accordance with various embodiments;

FIG. 12A), and a standard organic zinc-rich primer with an epoxy-based second layer incorporating microencapsulated healing agent (FIG. 12B), in accordance with various embodiments.

DETAILED DESCRIPTION OF DISCLOSED EMBODIMENTS

Figure 1:
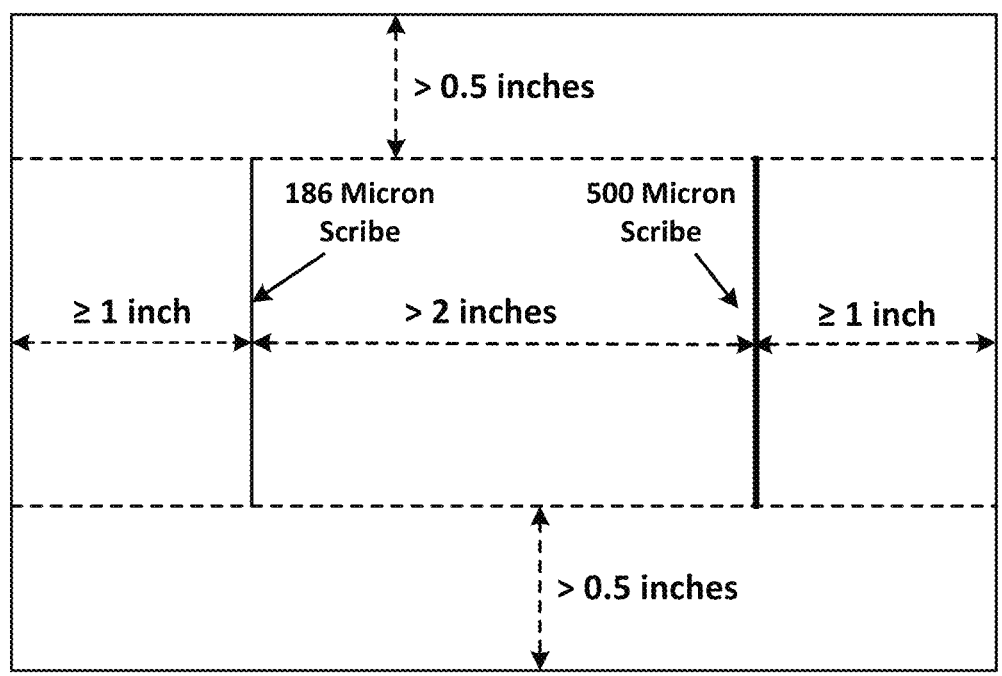
FIG. 1 illustrates a configuration of a system for evaluating a coating system's ability to maintain its adhesion and/or corrosion resistance following scribe damage on a metal substrate, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As used herein, the term "moisture-cured alkyl silicate binder" refers to a formulation incorporating a polymerizable monomer or oligomer that is an alky silicate. As defined herein, the general structure of an alky silicate is:

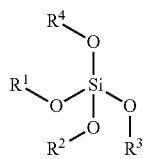

where $R^1$, $R^2$, $R^3$ and $R^4$ are alkyl groups or functionalized alkyl groups. In one specific, non-limiting example, the alkyl silicate may be tetraethyl orthosilicate, wherein $R^1$, $R^2$, $R^3$ and $R^4$ are ethyl groups:

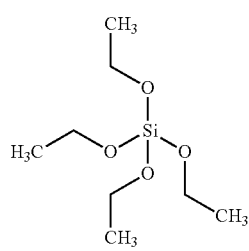

A moisture cured alkyl silicate binder may also include an oligomeric alkyl silicate. A generalized structure of an oligomeric alkyl silicate is provided below:

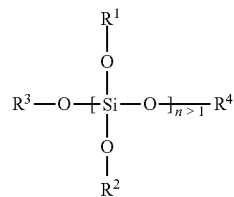

where $R^1$, $R^2$, $R^3$ and $R^4$ are alkyl groups or functionalized alkyl groups.

As used herein, the term "amine" refers to any organic compounds that include R—NH$_2$ (primary amine), R—NH—R (secondary amine), or R$_2$—N—R (tertiary amine), where "R" is an organic (contains carbon atoms) moiety.

As used herein, the term "aminosiloxane" refers to a compound incorporating R—NH$_2$ (primary aminosiloxane), R—NH—R (secondary aminosiloxane), or R$_2$—N—R (tertiary aminosiloxane), where "R" is an organosilicon moiety with at least one Si—O—Si linkage also present in the structure of the compound. As used herein, the term "glycidylalkoxysilane" refers to an organosilicon compound with the general structure provided below, where $R^1$, $R^2$, $R^3$ and $R^4$ are organic moieties which can each independently contain at least 1 glycidyl group.

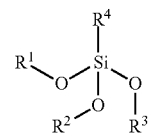

$R^1$, $R^2$, $R^3$ and $R^4$ are organic moieties and at least one of $R^1$, $R^2$, $R^3$ and $R^4$ contains a glycidyl functional group. The structure of a glycidyl functional group is provided below:

The term "(3-glycidyloxypropyl)trimethoxysilane" refers to the compound with the structure provided below.

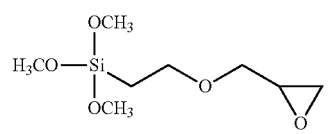 [SMILES: CO[Si](CCOCC1CO1)(OC)OC]

As used herein, the term "anhydride" refers to a compound formed by removing water from a more complex compound, such as an oxide of a nonmetal (acid anhydride) or a metal (basic anhydride) that forms an acid or a base, respectively, when united with water.

As used herein, the term "binder" refers to a polymerizable, hardenable, or curable formulation typically used as the medium into which all other pigments and additives are incorporated and which contributes most of the coating's adhesion to a substrate as well as its barrier property. The term "inorganic binder" refers to a binder in which the polymerizable, hardenable, or curable formulation is not comprised of a primarily carbon-based material. For example, the silicates referred to above are considered inorganic. The term "organic binder" refers to binders in which the polymerizable, hardenable, or curable formulation is comprised of a primarily carbon-based material.

As used herein, the term "boron trifluoride-amine complex" refers to a complex with the generalized structure: $BF_3.NR_3$, where R can be an organic moiety or hydrogen, depending on the functionality of the amine (primary amine—2 hydrogens, secondary amine—1 hydrogen, tertiary amine—no hydrogens).

As used herein, the term "efficiency of connectivity" (e.g., between zinc particles or between zinc particles and an underlying metal substrate) refers to the electrical connectivity between the zinc particles in the coating and between the zinc particles and the underlying substrate. The more efficient the connectivity, the better the protection of the underlying substrate via oxidation of the metallic zinc particles in the coating. The open circuit potential of the zinc-rich primer is an indication of the efficiency of the connectivity between metallic zinc particles and between the particles and the underlying steel substrate. As shown in Table 2, the standard zinc-rich coating exhibits an open circuit potential of −0.946 V for a cold-rolled steel substrate and −0.954 V for a blasted steel substrate relative to a standard silver/silver chloride electrode. For reference, the corrosion potential for metallic zinc relative to the same electrode has been measured at −0.98 V to −1.03 V, while that of steel has been measured at between −0.6 V to −0.71 V. Note that the closer the open circuit potential of the zinc-rich coating to the corrosion potential of metallic zinc, the more efficient the connectivity between the metallic zinc particles and between the particles and the underlying steel substrate.

As used herein, the term "epoxy resin" refers to a member of a class of reactive prepolymers and polymers which contain epoxide groups. Epoxy resins, also known as polyepoxides, may be reacted (cross-linked) either with themselves through catalytic homopolymerisation, or with a wide range of co-reactants including polyfunctional amines, acids (and acid anhydrides), phenols, alcohols and thiols. These co-reactants are often referred to as hardeners or curatives, and the cross-linking reaction is commonly referred to as curing. Reaction of polyepoxides with themselves or with polyfunctional hardeners forms a thermosetting polymer, often with favorable mechanical properties and high thermal and chemical resistance. Epoxy resins have a wide range of applications, including metal coatings, electronics and electrical components, high tension electrical insulators, fiber-reinforced plastic materials, and structural adhesives.

As used herein, the term "imidazole" refers to an organic compound with the formula $C_3N_2H_4$. Imidazoles are aromatic heterocycles, classified as diazoles, and having non-adjacent nitrogen atoms.

As used herein, the term "improvement in a barrier property" refers to an improvement in a coating's ability to resist the penetration of corrosive species such as water, ions and oxygen, through the coating and on to the substrate. The term "improvement in adhesion maintenance" refers to the ability of a coating to remain adhered to a substrate in spite of the penetration of water, ions, and oxygen through the coating and on to the coating-substrate interface, wherein a result of corrosion and related processes due to these species the adhesion of the coating can be compromised. The term "improvement in corrosion resistance refers to a coating's imperviousness to the processes that typically result in corrosion at the coating-substrate interface. Corrosion resistance is often the result of improved barrier properties and improved adhesion maintenance.

As used herein, the term "ketamine" refers to an arylcyclohexylamine derivative having the structure:

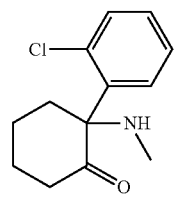 [SMILES: CNC1(c2ccccc2Cl)CCCCC1=O]

As used herein, the term "ketimine" refers to a an organic compound containing a carbon-nitrogen double bond where the carbon with the structure:

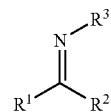

Where $R^1$ and $R^2$ are organic substituents and $R^3$ is hydrogen (primary ketimine) or an organic substituent (secondary ketimine).

As used herein, the term "melamine formaldehyde" refers to a hard, thermosetting plastic material made from melamine and formaldehyde by polymerization. There are many types, varying from very slow to very fast curing. Melamine-formaldehyde resins feature $NCH_2OCH_2N$ repeat units.

As used herein, the term "mercaptan" refers to an organosulfur compound that contains a carbon-bonded sulfhydryl (R—SH) group (where R represents an alkyl or other organic substituent). Mercaptans are also referred to as thiols, and are the sulfur analogue of alcohols (that is, sulfur takes the place of oxygen in the hydroxyl group of an alcohol).

As used herein, the term "organic acid hydrazide" refers to a member of a class of organic compounds characterized by a nitrogen-nitrogen covalent bond with four substituents, with at least one of them being an acyl group.

As used herein, the term "photo or ultraviolet curing agent" refers to a photopolymer or light-activated resin, or a photoinitiator. A photopolymer is a polymer that changes its properties when exposed to light, often in the ultraviolet or visible region of the electromagnetic spectrum. These changes are often manifested structurally, for example hardening of the material occurs as a result of cross-linking when exposed to light. A photoinitiator is a compound that decomposes into reactive species that activate polymerization of specific functional groups on oligomers when exposed to light or radiation.

As used herein, the term "polyacrylate" refers to any of a group of polymers formed by the polymerization of acrylate monomers. Acrylate monomers are based on the structure of acrylic acid, which includes a vinyl group and a carboxylic acid terminus. Other typical acrylate monomers are derivatives of acrylic acid, such as methyl methacrylate, in which one vinyl hydrogen and the carboxylic acid hydrogen are both replaced by methyl groups, and acrylonitrile, in which the carboxylic acid group is replaced by the related nitrile group. Other specific, non-limiting examples of acrylate monomers include methacrylate, methyl acrylate, ethyl acrylate, 2-chloroethyl vinyl ether, 2-ethylhexyl acrylate, hydroxyethyl methacrylate, butyl acrylate, and butyl methacrylate.

As used herein, the term "polyimide" refers to a macromolecule with repeating units linked by amide bonds. Polyamides occur both naturally and artificially. Examples of naturally occurring polyamides are proteins. Synthetic polyamides may be made through step-growth polymerization or solid-phase synthesis yielding materials such as nylons, aramids, and sodium poly(aspartate). As used herein, the term "polyimide" also refers to any macromolecule or polymer containing amide end-groups regardless of the functional groups represented in the repeating units of the polymer.

As used herein, the term "polyamine" refers to an organic compound having two or more primary amino groups. Low-molecular-weight linear polyamines include putrescine, cadaverine, spermidine, and spermine. This class of compounds also includes several synthetic substances such as ethylene diamine, 1,3-diaminopropane, and hexamethylenediamine. Certain polyamines are employed as co-reactants (hardeners) with epoxy resins. Piperazine is an example of a cyclic polyamine. Cyclen and cyclam are examples of macrocyclic polyamines. Polyethylene amine is a polymer based on the aziridine monomer. As used herein, the term "polyamine" also refers to any macromolecule or polymer containing amine end-groups regardless of the functional groups represented in the repeating units of the polymer.

As used herein, the term "polysulfide" refers to a member of a class of chemical compounds containing chains of sulfur atoms. There are two main classes of polysulfides: anions and organic polysulfides. Anions have the general formula $S^{2-}_n$. These anions are the conjugate bases of the hydrogen polysulfides $H_2S_n$. Organic polysulfides generally have the formulae R—$(RS)_n$—R, where R=alkyl or aryl. Organic polysulfides with thiol (—SH) end groups are used as curing agents for epoxy resins and have the formulae HS—$(RS)_n$—R—SH, where R=alkyl or aryl.

As used herein, the term "polyurea" refers to a type of polymer that is derived from the reaction product of an isocyanate component and a primary amine component. The isocyanate may be aromatic or aliphatic in nature, and may be a monomer, polymer, or any variant reaction of isocyanates, quasi-prepolymer or a prepolymer. The amine may be a small multifunctional amine, an amine functionalized prepolymer, quasi-prepolymer, or an amine-terminated polymer resin. The amine component may be a resin blend made up of amine-terminated polymer resins, and/or amine-terminated chain extenders. The amine-terminated polymer resins typically do not have any intentional hydroxyl moieties. The resin blend may also contain additives or non-primary components. These additives may contain hydroxyls, such as pre-dispersed pigments in a polyol carrier. Normally, the resin blend does not contain a catalyst.

As used herein, the term "polyurethane" refers to polymer composed of organic units joined by carbamate (urethane) links. While most polyurethanes are thermosetting polymers that do not melt when heated, thermoplastic polyurethanes are also available. Polyurethane polymers are most commonly formed by reacting a di- or poly-isocyanate with a polyol. Both the isocyanates and polyols used to make polyurethanes contain, on average, two or more functional groups per molecule.

As used herein, the term "urea-formaldehyde" refers to a thermosetting resin or polymer, and is also referred to as urea-methanal. It is produced from urea and formaldehyde. The chemical structure of urea-formaldehyde polymer includes $[(O)CNCH_2]_n$ repeat units. Depending on the polymerization conditions, some branching can occur.

As used herein, the term "zinc-rich coating" refers to a coating containing metallic zinc particles uniformly dispersed throughout the coating to provide cathodic or sacrificial protection to the underlying substrate via the oxidation of the more electrochemically active metallic zinc particles instead of iron present in the underlying steel substrate. The coating is referred to as "zinc-rich" due to a loading of the zinc in the coating that increases the pigment volume concentration (PVC) beyond the critical pigment volume concentration (CPVC). When the coating is the first layer applied to a substrate, it is referred to as a zinc-rich primer. The term "zinc-rich coating system" refers to a system of coating layers incorporating at least one zinc-rich coating layer. Typically, in systems incorporating the zinc-rich coatings, the zinc-rich coating is the first layer applied on a metal substrate (zinc-rich primer) followed by additional layers that may be other types of coatings (which typically do not include metallic zinc particles) to form various multi-layer coating systems.

Embodiments herein provide microencapsulated healing agents that, upon incorporation into a zinc-rich coating or coating system, improve the coating or coating system's ability to maintain its adhesion and corrosion resistance after damage that exposes the underlying substrate. In various embodiments, these microencapsulated healing agent formulations are uniquely synergistic with zinc-rich coatings, and/or with zinc particles in a zinc rich coating, improving both adhesion maintenance and corrosion resistance following damage that exposes the substrate.

Also disclosed herein are coatings and coating systems that include a zinc-rich coating layer incorporating the microencapsulated healing agent formulation described above, such that the resulting microcapsules are either incorporated into the zinc-rich coating layer or in a layer adjacent to the zinc-rich coating layer (for example, the microcapsules may be incorporated into a coating layer that is applied directly to a zinc-rich coating layer). In various embodiments, the microcapsules may include (1) a polymeric shell wall, such as a shell wall comprising urea-formaldehyde, melamine formaldehyde, polyacrylate, polyurea or polyurethane, and (2) a core formulation comprising an epoxy resin, a hydrophobic polar aprotic solvent, and an alkoxysilane, such as a glycidyl alkoxysilane. In some embodiments, the glycidyl alkoxysilane may be 3-(glycidyloxypropyl)trimethoxysilane.

Also disclosed are zinc-rich coatings that include the microcapsules described above, wherein the coating binder is organic, and more specifically may be an epoxy resin cured by any of the following curing agents or a combination thereof: an amine, a polyamine, an anhydride, an aminosiloxane, an imidazole, a polyamide, a ketamine, a ketimine, a modified amine that is the reaction product of an amine and another compound, a mercaptan, a polymercaptan, a polysulfide, a thiol, a boron trifluoride-amine complexe, an organic acid hydrazide, or a photo or ultraviolet curing agent.

Further embodiments are zinc-rich coatings that include the microcapsules described above, wherein the coating binder is inorganic and may be, for example, an alkyl silicate binder. In some embodiments, the zinc-rich coating layer that includes the silicate binder may be mist-coated with an organic coating, and in some embodiments, the mist coating includes a binder which may be an epoxy resin cured by one or more of the following curing agents or combinations thereof: an amine, a polyamine, an anhydride, an aminosiloxane, an imidazole, a polyamide, a ketamine, a ketimine, a modified amine that is the reaction product of an amine and another compound, a mercaptan, a polymercaptan, a polysulfide, a thiol, a boron trifluoride-amine complex, an organic acid hydrazide, or a photo or ultraviolet curing agent.

Still other embodiments are coating systems that include at least one of the coatings described above as a primer layer applied closest to a metal substrate, which may be a steel substrate. Also disclosed are coating systems having multiple coating layers that include a coating layer incorporating the microcapsules as described above, but excluding zinc; wherein the coating layer is applied directly on top of an organic zinc-rich coating wherein the coating binder is organic in nature and more specifically may be (but is not limited to) an amine, a polyamine or polyimide-cured epoxy resin, or wherein the zinc-rich coating layer that includes the alkyl silicate binder is mist-coated with an organic coating wherein the mist coating is comprised of a binder that may be an amine, polyamine or polyamide-cured epoxy resin. In some embodiments, a mist coat may be applied to the primer layer prior to application of the second coating layer. In some embodiments, the mist coat may be identical or substantially similar to the second coating layer in composition and chemistry, except that it is substantially lower in viscosity relative to the formulation comprising the second coating layer.

Zinc-rich coatings are formulated with high volume concentrations of zinc particles and are applied directly to the substrate. An important factor in the ability of these coatings to effectively provide sacrificial cathodic protection to the substrate is that the pigment volume concentration (PVC) of the zinc pigment must be equal to or greater than the critical pigment volume concentration (CPVC). This ensures that all the zinc particles in the coating are electrically connected to each other as well to the steel substrate. However, this sacrificial cathodic protection depends on the number of zinc particles in contact with each other to form a conductive network throughout the coating. The more efficient the connectivity between the zinc particles, the more effective protection the coating provides.

Since zinc is electrochemically more active than iron, it will preferentially undergo oxidation under corrosive conditions to form zinc oxides and hydroxides. The resulting corrosion products of zinc are insoluble in water and therefore improve the barrier properties of the coating by reducing the porosity inherent in a zinc-based system in which the primer is designed to exhibit a pigment volume concentration greater than the CPVC. A consequence of the oxidation of zinc, however, is the decrease in the efficiency of the connectivity between the zinc particles, as the resulting zinc oxides and hydroxides are electrically non-conductive. As such, to control the oxidation of zinc and thereby increase the life of the sacrificial cathodic protection, zinc-rich coatings are typically top-coated with non-zinc build, tie and top coats that utilize a range of chemistries.

Microcapsule-based self-healing coatings belong to a new class of smart coating technologies that increases the lifetime of coating systems and the underlying substrates they protect via in-situ autonomic repair of damage to the coating. Such self-healing systems are designed to maintain the coating's adhesion to the substrate after damage. Unlike known coating technologies that are based on chemistries common to the protective coating industry, including epoxy, polyurethane, acrylic and silicone-based coatings, the present disclosure provides self-healing functionality realized via the incorporation of a microencapsulated healing agent formulation into various zinc-rich coatings. As disclosed herein, in various embodiments, the addition of self-healing functionality to a zinc-rich primer or multi-layer coating system controls the sacrificial oxidation process of zinc and facilitates maintenance of adhesion of the coating system at the site of damage.

Thus, disclosed in various embodiments are microencapsulated healing agent formulations that include an epoxy resin, a polar aprotic solvent, and a glycidyl akloxysilane. As disclosed herein, an optimum formulation was determined that showed surprising efficacy relative to the control. Representative examples of several formulations evaluated are shown in Table 1.

TABLE 1

Disclosed and comparative examples

| Component | Disclosed Example (Standard S2) | Comp. Example 1 (Version 1) | Comp. Example 2 (Version 2) | Comp. Example 3 (Version 3) | Comp. Example 4 (Version 4) |
|---|---|---|---|---|---|
| Epoxy Resin (wt. %) | 47.5 | 47.5 | 52.5 | 57.5 | 47.5 |
| Polar Aprotic Solvent (wt. %) | 45.5 | 50.5 | 45.5 | 40.5 | 40.5 |
| Non-Polar Diluent (wt. %) | 2 | 2 | 2 | 2 | 2 |
| Alkoxy Silane Solution (wt. %) | 5 | 0 | 0 | 0 | 10 |
| Total (wt. %) | 100 | 100 | 100 | 100 | 100 |

The disclosed formulations were microencapsulated via a urea-formaldehyde shell wall using the procedures outlined below in Example 1. The resulting capsules were incorporated into zinc-rich coating systems as described in Example 2.

Figure 2A:
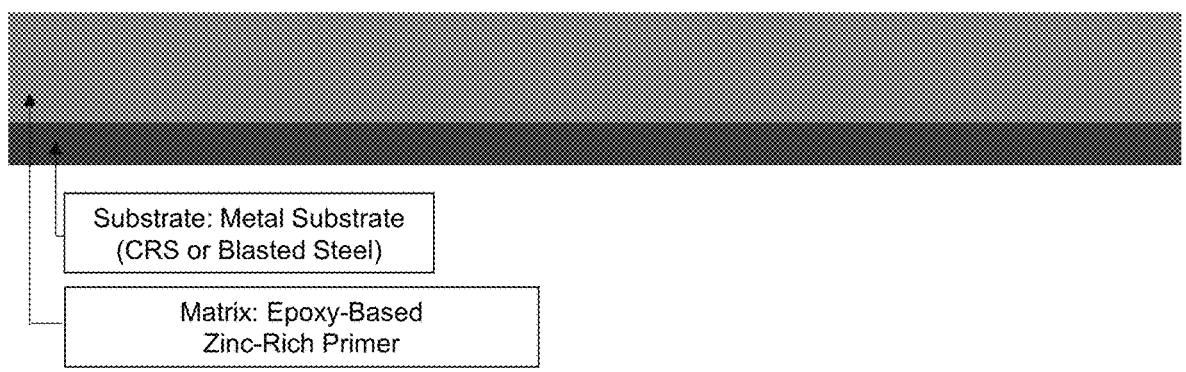
FIGS. 2A and 2B show a schematic comparison of two zinc-rich coatings that were compared in one-coat tests, including a standard organic zinc-rich primer (control.
Figure 2B:
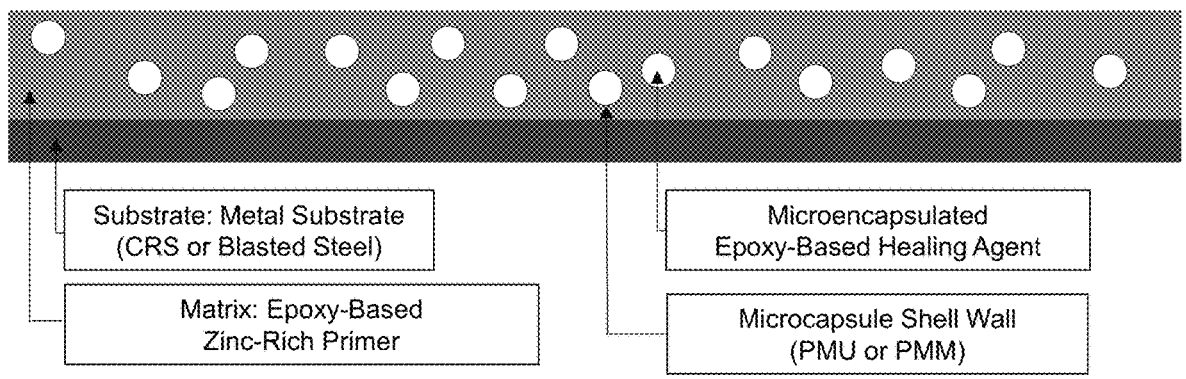
Figure 3A:
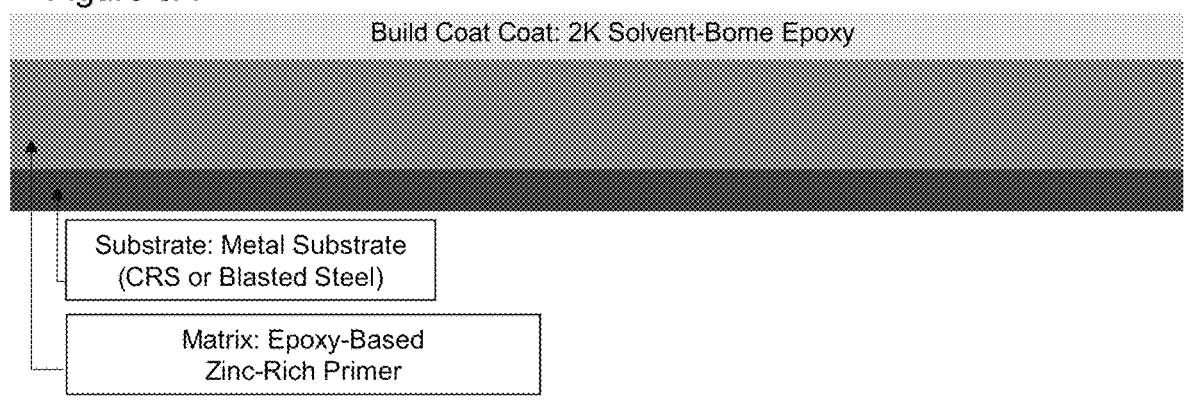
FIGS. 3A and 3B show a schematic comparison of two zinc-rich coating systems that were compared in two-coat tests, including a standard organic zinc primer with an epoxy-based second layer (control.
Figure 3B:
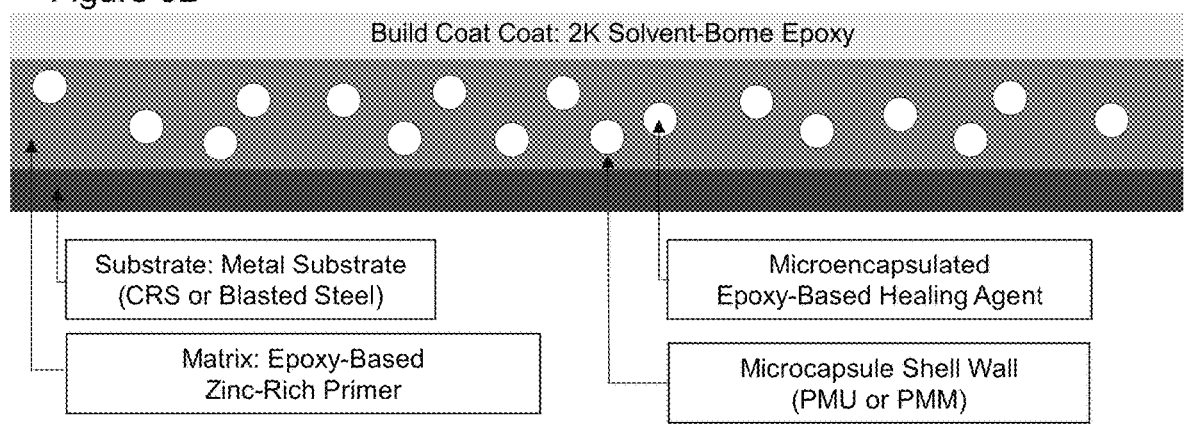

FIG. 1 illustrates a configuration of a system for evaluating a coating system's ability to maintain its adhesion and corrosion resistance following scribe damage on metal substrates, showing an exemplary panel that is 3 inches wide and 5 inches long, in accordance with various embodiments. This system was used in various experimental conditions as described below to evaluate the efficacy of the described formulations at inhibiting corrosion and/or maintaining adhesion at the site of the damage caused by the scribe. For one-coat studies, the formulations were applied to lightly abraded cold-rolled steel substrates via a gravity feed conventional spray gun. The samples were allowed to cure for a minimum of 3 days prior to scribing using a 186-micron scribe tool and 500-micron scribe tool. FIGS. 2A and 2B show a schematic comparison of two zinc-rich coatings that were compared in one-coat tests, including a standard organic zinc-rich primer (control; FIG. 2A), and a standard organic zinc-rich primer that incorporates a microencapsulated healing agent (FIG. 2B), in accordance with various embodiments;

FIGS. 3A and 3B show a schematic comparison of two zinc-rich coating systems that were compared in two-coat tests, including a standard organic zinc primer with an epoxy-based second layer (control; FIG. 3A), and a standard organic zinc-rich primer incorporating microencapsulated healing agent with an epoxy-based second layer (FIG. 3B), in accordance with various embodiments. For the two-coat studies, a second coat of an epoxy-polyamide coating was applied, and the resulting system was allowed to cure for an additional 3 days prior to scribing with 186-micron and 500-micron scribe tools. After scribing, the samples were allowed to heal for a minimum of 24 hours prior to exposure to a salt fog. A schematic showing a comparison between the standard zinc control excluding capsules and the test samples containing capsules (Standard S2, Versions 1-4) prepared for the one-coat study is shown in FIG. 2 and a schematic showing a similar comparison for the coated substrates prepared for the two-coat study is shown in FIG. 3. The samples were evaluated after 500 hours of salt fog exposure and the degree of blistering observed on the surface of the coated substrates around the scribe was rated using the protocol outlined in ASTM D714.

Figure 4A:
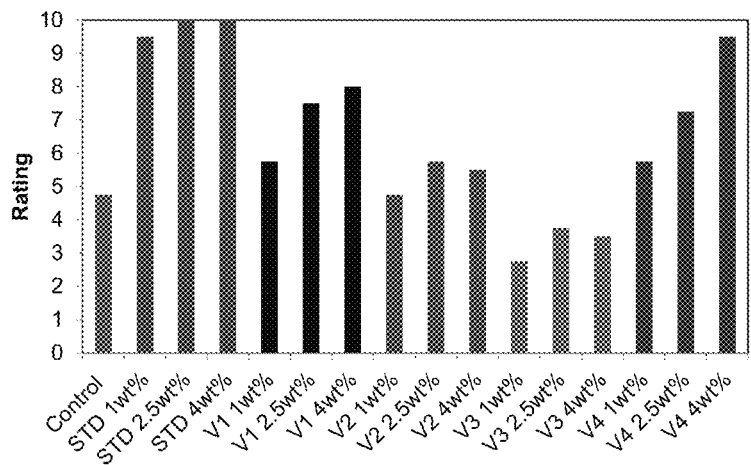
FIGS. 4A and 4B are two graphs illustrating the results of testing of several microencapsulated healing agent formulations in one-coat studies using a 186-micron scribe (FIG. 4A) and a 500-micron scribe (FIG. 4B), and providing a summary of "degree of blistering" results using a rating system from ASTM D714, where adhesion loss was observed to occur where the blistering around the scribe had previously occurred, in accordance with various embodiments.
Figure 4B:
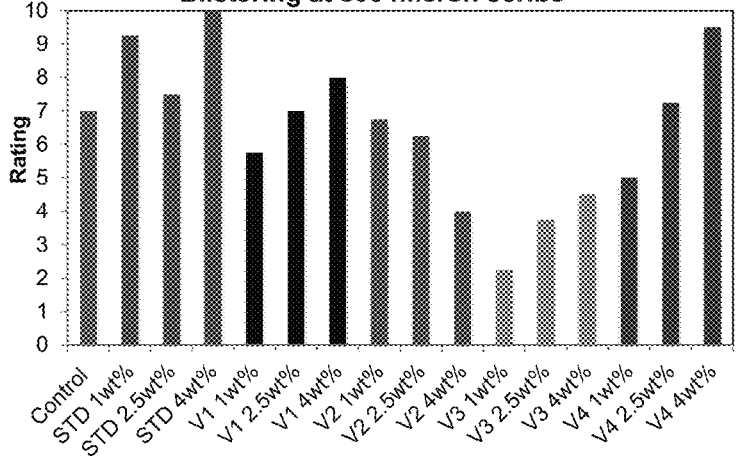

FIGS. 4A and 4B are two graphs illustrating the results of testing of several microencapsulated healing agent formulations in one-coat studies using a 186-micron scribe (FIG. 4A) and a 500-micron scribe (FIG. 4B), and providing a summary of "degree of blistering" results using a rating system from ASTM D714, where adhesion loss was observed to occur where the blistering around the scribe had previously occurred. The ability of the coating to maintain its adhesion to the substrate around the scribe was also evaluated using a pressure-sensitive adhesive tape applied over the test area and rapidly pulled off at angle of 90 degrees to the substrate. The degree of adhesion loss observed around the scribe was consistent with the areas observed to have blistered.

Figure 5A:
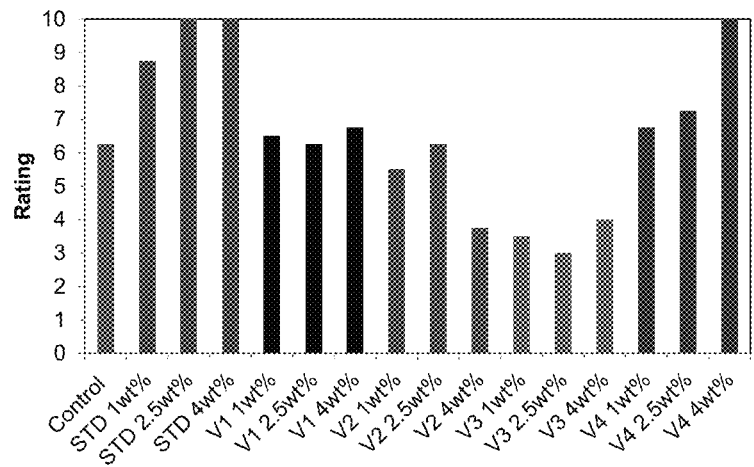
FIGS. 5A and 5B are two graphs illustrating the results of testing of several microencapsulated healing agent formulations in one-coat studies using a 186-micron scribe (FIG. 5A) and a 500-micron scribe (FIG. 5B), and providing a summary adhesion loss results using the same rating system from ASTM D714, in accordance with various embodiments.
Figure 5B:
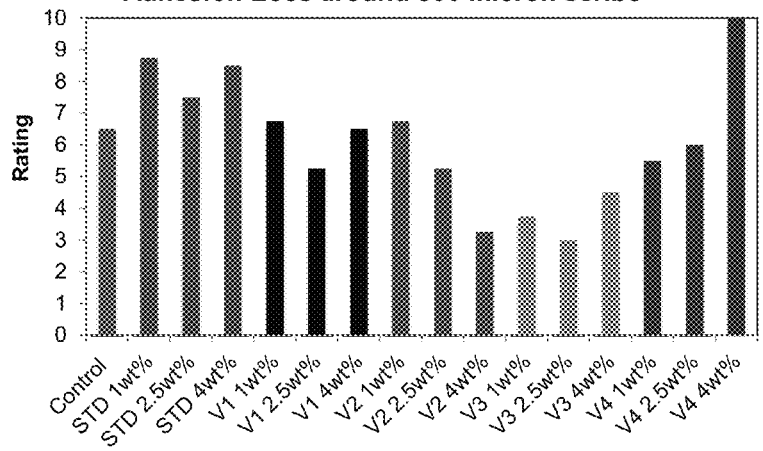

FIGS. 5A and 5B are two graphs illustrating the results of testing of several microencapsulated healing agent formulations in one-coat studies using a 186-micron scribe (FIG. 5A) and a 500-micron scribe (FIG. 5B), and providing a summary adhesion loss results using the same rating system from ASTM D714. To isolate the effect of various components in the encapsulated formulation, the performance of the disclosed or standard formulation (labeled STD) were compared to comparative example 1 (labeled version 1 or V1), comparative example 1 (labeled version 1 or V1), comparative example 2 (labeled version 2 or V2), comparative example 3 (labeled version 3 or V3), comparative example 4 (labeled version 4 or V4) at 1 wt. %, 2.5 wt. % and 4 wt. % loadings in a zinc-rich primer applied in one coat, as well as in a 2-coat system with an epoxy/amine coating applied as the second coat. For the one-coat and two-coat studies, the coating was applied to cold-rolled steel (CRS) substrates.

FIG. 4 shows that for the 186-micron scribe, relative to V1-V3, the incorporation of the disclosed microencapsulated healing agent additive into the zinc-rich coating led to an improvement in blistering performance (FIG. 4A) as well as coating adhesion around the scribe (FIG. 4B), which closely reflected the blistering performance. A similar trend was observed for the 500-micron scribe although, not surprisingly given the size of the scribe, blistering performance (FIG. 5A) and corresponding adhesion loss (FIG. 5B) were more severe.

Figure 6A:
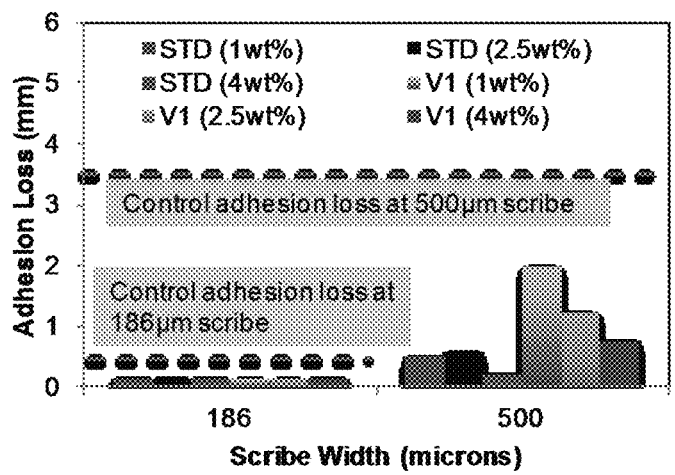
FIGS. 6A, 6B, and 6C illustrate a comparison of the disclosed microencapsulated healing agent formulation (STD) with comparative formulations V1 (version 1.
Figure 6B:
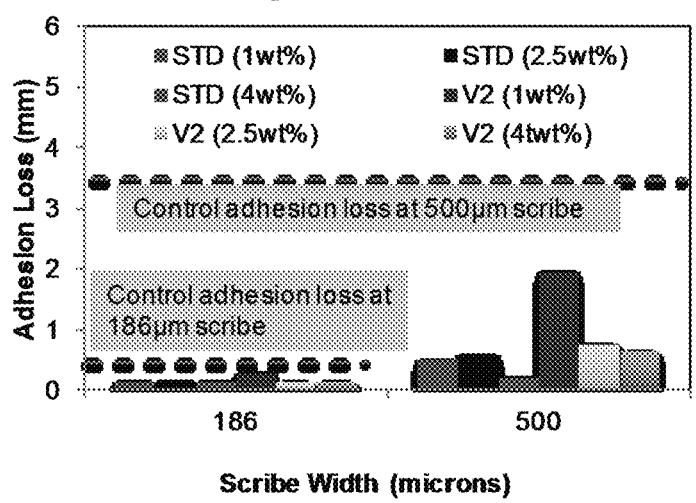
Figure 6C:
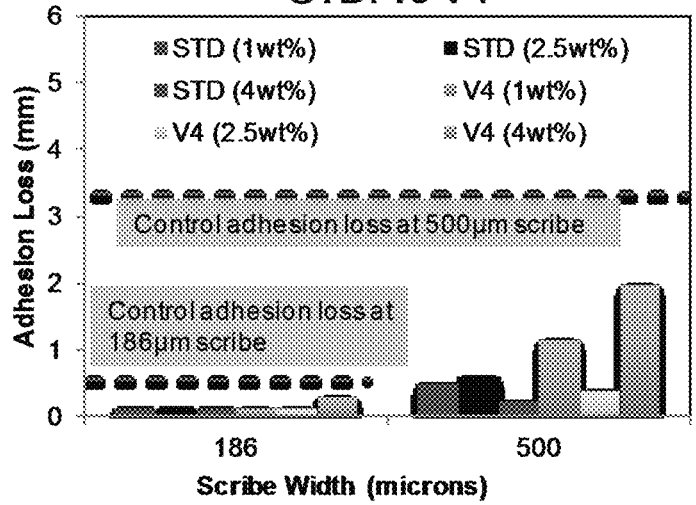

FIGS. 6A, 6B, and 6C illustrate a comparison of the disclosed microencapsulated healing agent formulation (STD) with comparative formulations V1 (version 1; FIG. 6A), comparative formulation V2 (version 2; FIG. 6B), and comparative formulation V4 (version 4; FIG. 6C) in two-coat evaluations with an epoxy-based build coat applied as shown in FIG. 3, in accordance with various embodiments. An evaluation of two-coat systems incorporating the microencapsulated healing agent formulations shown in Table 1 exhibited a similar trend to the observations made in the one coat study. A comparison of the disclosed example to V1 (FIG. 6A) and V2 (FIG. 6B) isolates the effect of the glycidyl alkoxysilane in the formulation. As FIGS. 6A and 6B show, all three formulations (STD, V1 and V2) exhibited substantial decreases in adhesion loss relative to a control which did not include any encapsulated healing agent additives. However, in general the disclosed example (STD) led to a minimization of adhesion loss of 50-75% relative to V1 (FIG. 6A) and 20-75% relative to V2 (FIG. 6B). As such, both one-coat and two-coat studies confirmed the importance of the glycidylalkoxysilane to the performance of disclosed microencapsulated healing agent additive.

A comparison of the disclosed microencapsulated healing agent formulation (STD) to V4 isolates the effect of the concentration of the glycidylalkoxysilane in the disclosed formulation. For the one coat study, a comparison of the performance of the STD and V1 microencapsulated healing agent formulations showed blistering performance (FIG. 4A) and the corresponding adhesion loss ratings (FIG. 4B) adjacent to the 186-micron scribe which were improved for the STD formulation relative to the V4 formulation when all three concentrations (1 wt. %, 2.5 wt. % and 4 wt. %) were taken into consideration. Similar observations were made for the 500-micron scribe (FIGS. 5A and 5B). In the two-coat study, the STD and V4 formulations exhibited the best performance for adhesion maintenance of all 5 formulations evaluated. However, a closer analysis of the adhesion loss observed for both the 186-micron scribe and the 500-micron scribe reveals a decrease in adhesion loss for the disclosed encapsulated healing agent formulation (STD) relative to the comparative formulation, V4 (FIG. 6C). Thus, increasing the glycidylalkoxysilane component alone does not lead to an improvement, and taken together with the observations discussed above for V1-V3, the performance observed was not a function of the glycidylalkoxysilane or any other component alone, but rather a consequence of the unique combination of all the components.

Unique Performance of the Disclosed Encapsulated Healing Agent Formulation

When damage occurs to a coating or coating system incorporating the microencapsulated healing agent additive, the microcapsules are ruptured and the healing agent formulation is released into the site of damage. Once in the site of damage, the epoxy resin is cross-linked by residual curing agent in the matrix, while the glycidylalkoxysilane promotes adhesion of the polymerized healing agent to the substrates. The healing agent formulation may also coat some of the zinc particles, thereby controlling their rate of oxidation and facilitating sacrificial protection of the substrate over a longer period of time. Thus, the use of an epoxy-based healing agent chemistry is essential to the adhesion maintenance and corrosion resistance discussed above.

The importance of the epoxy resin, the polar aprotic solvent, and the glycidylalkoxysilane (and their relative concentrations in the healing agent formulation) is evident. The epoxy resin is needed for facilitating the cross-linking of the healing agent with residual curing agent in the matrix. The glycidylalkoxysilane promotes adhesion to the substrate and, along with the polymerized epoxy resin, controls the oxidation of zinc. However, too much of it compromises the properties of the polymerized healing agent, presumably via plasticization of the film and chain termination of the polymerization as the adhesion maintenance and corrosion resistance was observed to decline with increasing concentrations. The ratio of the polar aprotic solvent to the epoxy resin balances the ability of the healing agent to flow to the site of damage by keeping the healing agent viscosity at the optimal level, while ensuring a sufficient amount of the solvent is available for eluting out residual curing agent from the coating matrix to promote the cross-linking reaction with the epoxy resin delivered to the site of damage during a healing event.

In addition to the function of each component of the healing agent, compatibility of the chemistry of the healing agent, which is reflected to some extent in the shell wall, with the chemistry of the zinc-rich coating matrix is needed. In other words, for the disclosed example, the epoxy resin-based chemistry is considered highly compatible with the epoxy-based chemistry of the zinc-rich primer.

Figure 7A:
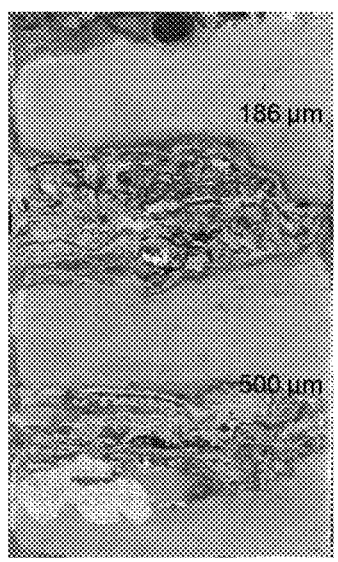
FIGS. 7A, 7B, and 7C illustrate a comparison of the performance of a zinc-rich primer (FIG. 7A) to the same coating formulation containing a formulation similar to the disclosed example in which the epoxy resin was replaced with an alkyd resin (FIG. 7B) and the same coating incorporating the disclosed microencapsulated healing agent (FIG. 7C), in accordance with various embodiments.
Figure 7B:
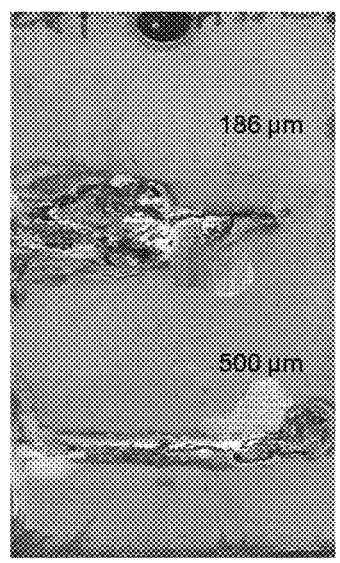
Figure 7C:
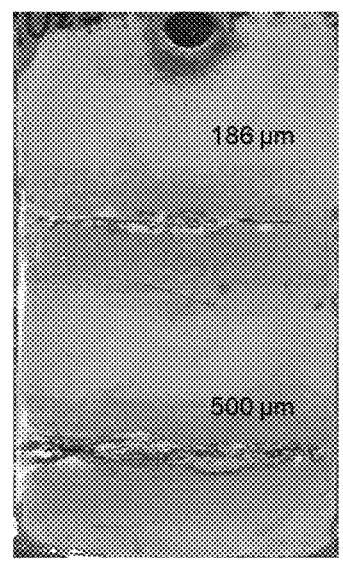

FIGS. 7A, 7B, and 7C illustrate a comparison of the performance of a zinc-rich primer (FIG. 7A) to the same coating formulation containing a formulation similar to the disclosed example in which the epoxy resin was replaced with an alkyd resin (FIG. 7B) and the same coating incorporating the disclosed microencapsulated healing agent (FIG. 7C), in accordance with various embodiments. To demonstrate the importance of compatibility, the disclosed microencapsulated healing agent was compared to similarly encapsulated healing agent formulations based on different chemistries. The first comparison was made relative to an alkyd-based formulation (FIG. 7). As the results show, after 500 hours of salt fog exposure, minimal improvement was observed for the zinc-rich primer incorporating the alkyd-based comparative example relative to the control, while incorporation of the disclosed formulation resulted in a significant improvement relative to the control.

Figure 8A:
FIGS. 8A, 8B, and 8C illustrate a comparison of the performance of a zinc-rich primer (FIG. 8A) to the same coating formulation containing a formulation similar to the disclosed example in which the epoxy resin was replaced with a polydimethylsiloxane (PDMS)-based resin (FIG. 8B) and the same coating incorporating the disclosed microencapsulated healing agent (FIG. 8C), in accordance with various embodiments.
Figure 8B:
Figure 8C:
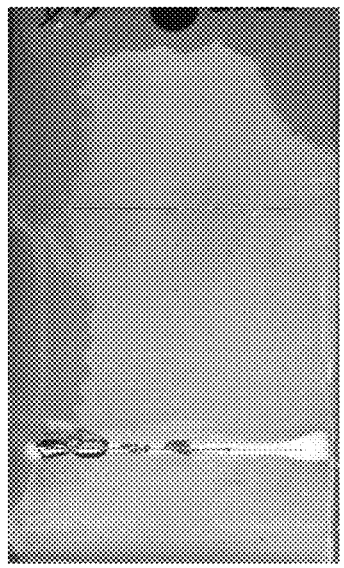

FIGS. 8A, 8B, and 8C illustrate a comparison of the performance of a zinc-rich primer (FIG. 8A) to the same coating formulation containing a formulation similar to the disclosed example in which the epoxy resin was replaced with a polydimethylsiloxane (PDMS)-based resin (FIG. 8B) and the same coating incorporating the disclosed microencapsulated healing agent (FIG. 8C), in accordance with various embodiments. The second comparison was made relative to a polydimethylsiloxane (PDMS)-based formulation (FIG. 8). As was the case with the previous example, incorporation of the encapsulated PDMS-based formulation into the zinc-rich primer did not result in a meaningful performance improvement relative to the control, while the disclosed example exhibited practically no adhesion loss or corrosion creep at the 186-micron or 500-micron scribes after 500 hours of salt fog exposure. These results further confirm the importance of the epoxy chemistry comprising the disclosed healing agent formulation.

Maintenance of Zinc Connectivity

As already discussed, the performance of zinc-rich primers depends heavily on the connectivity between the zinc particles in the coating and between the zinc-particles and the less electrochemically active steel substrate. To determine the effect of the incorporation of the disclosed microencapsulated healing agent into a zinc-rich coating on the connectivity of the zinc sacrificial corrosion system, the open circuit potentials of a zinc-rich coating excluding the disclosed microencapsulated healing agent (control) were compared to the same coating containing the maximum loading evaluated (4 wt. %) of the disclosed microencapsulated healing agent at a capsule size of 10 microns in one example and at a microcapsule size of 25 microns in a second example. For both disclosed examples, no material differences in the open circuit potential was observed for either of the formulations containing the disclosed microencapsulated healing agent formulation regardless of the average sizes of the microcapsules incorporated (Table 2).

The open circuit potential measurements were made using an electrochemical set-up. Specifically, electrochemical characterization was carried out in a 3 wt. % NaCl solution, using a VMP3 multichannel potentiostat (VMP3, Biologic, USA). A glass cylinder was affixed to the coated metal surface to be evaluated by a rubber O-ring clamped to the substrate and filled with the electrolyte (3 wt. % NaCl solution). The reference electrode (standard silver/silver chloride electrode) and counter electrode (platinum wire) were then inserted into the electrolyte solution. The working electrode was connected to the sample (coated metal substrate) to be tested. The total tested area was 7 cm$^2$. The open circuit potential was measured for 15 minutes to ensure that the system was stable and at equilibrium.

TABLE 2

Effect of the incorporation of the disclosed microencapsulated healing agent into a zinc rich primer at a loading of 4 wt. % and in the form of either 10-micron or 25-micron capsules

| | Open Circuit Potential | |
|---|---|---|
| Formulation Description | Cold-Rolled Steel | Blasted Steel |
| Standard Coating (No Capsules) | −0.946 V | −0.954 V |
| Standard Coating, 4 wt. % of the microencapsulated Disclosed Formulation at 10 Microns | −0.928 V | −0.939 V |
| Standard Coating, 4 wt. % of the microencapsulated Disclosed Formulation at 25 Microns | −0.943 V | −0.948 V |

Effect of Substrate Preparation and Repeatability

Figure 9A:
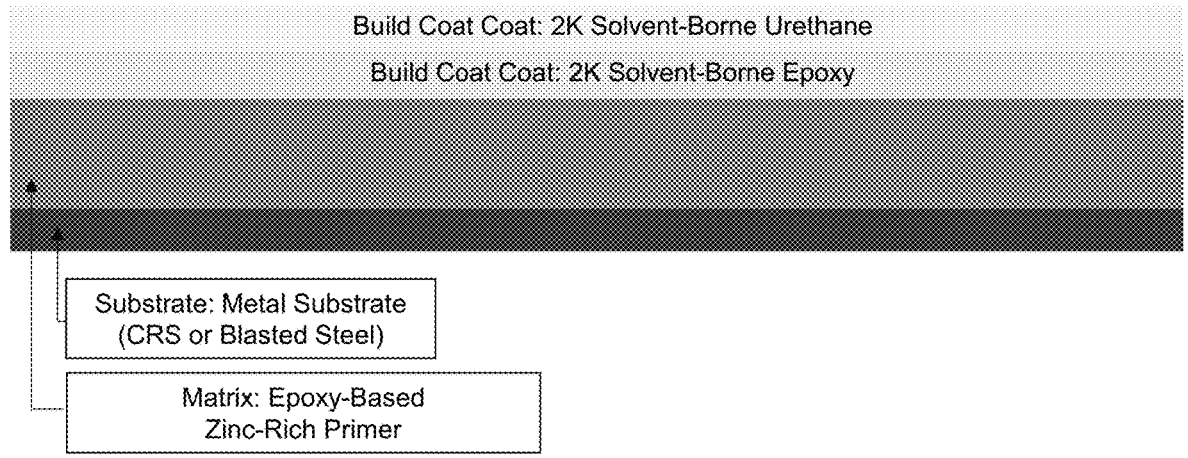
FIGS. 9A and 9B illustrate a comparison of systems evaluated in full system (three-coat) tests, including a standard organic zinc primer (control.
Figure 9B:
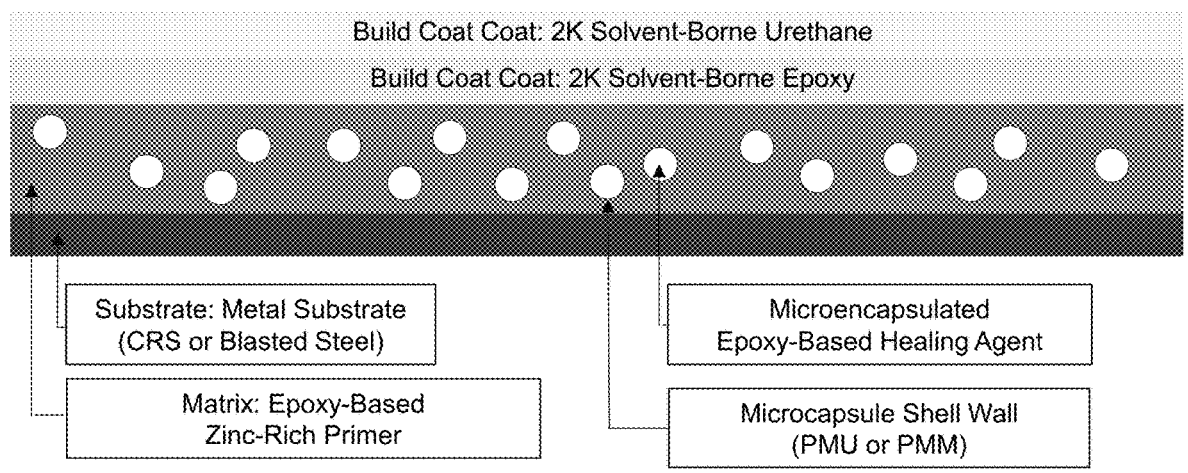

FIGS. 9A and 9B illustrate a comparison of systems evaluated in full system (three-coat) tests, including a standard organic zinc primer (control; FIG. 9A), an epoxy build coat and polyurethane top coat, and a standard organic zinc-rich primer incorporating microencapsulated healing agent, an epoxy build coat, and a polyurethane top coat (FIG. 9B), in accordance with various embodiments. A set of evaluations of one-coat (FIG. 2), two-coat (FIG. 3) and three-coat (FIG. 9, full system configuration) systems were performed on a combination of substrates designed to cover a wide range of surface preparation approaches. The results are summarized in Tables 3, 4 and 5. In general, the incorporation of the disclosed microencapsulated healing agent formulation into the zinc rich primer resulted in a significant improvement in a coating or coating system's ability to maintain adhesion to the substrate and minimize corrosion creep on poorly prepared substrates (SSPC-SP3) and well-prepared substrates (SSPC-SP10) substrates alike. This observation for poorly prepared substrates represents the potential of using the disclosed microencapsulated healing agent additive to extend the utility of organic-zinc rich primers to less than ideally prepared substrates. Tables 3, 4 and 5 also show the scope of studies performed, demonstrating the repeatability of the performance improvement observed in a range of products and systems on the market today.

TABLE 3

Effect of Disclosed microencapsulated healing agent in one-coat evaluations of zinc-rich primers

| Syst. No. | Substrate Prep. (SSPC[a]) | Zinc Primer Chem. (Product Type[b]) | Zinc Primer Zinc Content (wt. %) | Discl. Additive Loading | Scribe Width (μ) | Exp. Time (h) | Creep (mm) |
|---|---|---|---|---|---|---|---|
| 1 | SSPC-SP3 | Epoxy/Fatty Acid Functionalized Polyamide | 45-70% | — | 186 | 240 | 6 |
| 2 | SSPC-SP3 | Epoxy/Fatty Acid Functionalized Polyamide | 45-70% | 4% | 186 | 240 | 0 |
| 1 | SSPC-SP3 | Epoxy/Fatty Acid Functionalized Polyamide | 45-70% | — | 500 | 240 | 8.3 |
| 2 | SSPC-SP3 | Epoxy/Fatty Acid Functionalized Polyamide | 45-70% | 4% | 500 | 240 | 0.2 |
| 3 | SSPC-SP3 | Epoxy/Fatty Acid Functionalized Polyamide | 45-70% | — | 186 | 500 | 12.4 |
| 4 | SSPC-SP3 | Epoxy/Fatty Acid Functionalized Polyamide | 45-70% | 4% | 186 | 500 | 0 |
| 3 | SSPC-SP3 | Epoxy/Fatty Acid Functionalized Polyamide | 45-70% | — | 500 | 500 | 11.9 |
| 4 | SSPC-SP3 | Epoxy/Fatty Acid Functionalized Polyamide | 45-70% | 4% | 500 | 500 | 1.1 |
| 5 | SSPC-SP3 | Epoxy/Polyamide | 65-85% | — | 186 | 240 | 9.6 |
| 6 | SSPC-SP3 | Epoxy/Polyamide | 65-85% | 4% | 186 | 240 | 0.7 |
| 5 | SSPC-SP3 | Epoxy/Polyamide | 65-85% | — | 500 | 240 | 4.3 |
| 6 | SSPC-SP3 | Epoxy/Polyamide | 65-85% | 4% | 500 | 240 | 0.7 |
| 7 | SSPC-SP3 | Epoxy/Polyamide | 65-85% | — | 186 | 500 | 10.6 |
| 8 | SSPC-SP3 | Epoxy/Polyamide | 65-85% | 4% | 186 | 500 | 0.8 |
| 7 | SSPC-SP3 | Epoxy/Polyamide | 65-85% | — | 500 | 500 | 7.0 |
| 8 | SSPC-SP3 | Epoxy/Polyamide | 65-85% | 4% | 500 | 500 | 0.9 |
| 9 | SSPC-SP3 | Epoxy/Polyamide | 65-85% | — | 186 | 750 | 11.9 |
| 10 | SSPC-SP3 | Epoxy/Polyamide | 65-85% | 4% | 186 | 750 | 1.1 |
| 9 | SSPC-SP3 | Epoxy/Polyamide | 65-85% | — | 500 | 750 | 9.7 |
| 10 | SSPC-SP3 | Epoxy/Polyamide | 65-85% | 4% | 500 | 750 | 0.9 |

Note:
[a]The standard employed here for surface preparation is the result of the joint effort between the Society for Protective Coatings (SSPC) and the National Association of Corrosion Engineers (NACE) (https://protective.sherwin-williams.com/pdf/tools-charts-list/surface_preparation_standards.pdf) Only the SSPC designation is used here.

TABLE 4

Effect of disclosed microencapsulated healing agent in two-coat evaluations of zinc-rich primers

| Syst. No. | Substrate Prep. (SSPC[a]) | Zinc Primer Chem. | Zinc Primer Zinc Content (wt. %) | Discl. Additive Loading | Second Coat | Scribe Width (μ) | Exp. Time (h) | Creep (mm) |
|---|---|---|---|---|---|---|---|---|
| 11 | SSPC-SP3 | Epoxy/Polyamide | 70% | — | Epoxy/Polyamide (Catalyzed) | 186 | 500 | 9.2 |
| 12 | SSPC-SP3 | Epoxy/Polyamide | 70% | 4% | Epoxy/Polyamide (Catalyzed) | 186 | 500 | 2.1 |
| 11 | SSPC-SP3 | Epoxy/Polyamide | 70% | — | Epoxy/Polyamide (Catalyzed) | 500 | 500 | 13.0 |
| 12 | SSPC-SP3 | Epoxy/Polyamide | 70% | 4% | Epoxy/Polyamide (Catalyzed) | 500 | 500 | 3.4 |
| 13 | SSPC-SP10 | Epoxy/Polyamide | 76% | — | Epoxy/Polyamide | 186 | 1000 | 10.5 |
| 14 | SSPC-SP10 | Epoxy/Polyamide | 76% | 4% | Epoxy/Polyamide | 186 | 1000 | 1.7 |

TABLE 4-continued

Effect of disclosed microencapsulated healing agent in two-coat evaluations of zinc-rich primers

| Syst. No. | Substrate Prep. (SSPC[a]) | Zinc Primer Chem. | Zinc Primer Zinc Content (wt. %) | Discl. Additive Loading | Second Coat | Scribe Width (μ) | Exp. Time (h) | Creep (mm) |
|---|---|---|---|---|---|---|---|---|
| 13 | SSPC-SP10 | Epoxy/Polyamide | 76% | — | Epoxy/Polyamide | 500 | 1000 | 13.1 |
| 14 | SSPC-SP10 | Epoxy/Polyamide | 76% | 4% | Epoxy/Polyamide | 500 | 1000 | 2.2 |

Note:
[a]The standard employed here for surface preparation is the result of the joint effort between the Society for Protective Coatings (SSPC) and the National Association of Corrosion Engineers (NACE) (https://protective.sherwin-williams.com/pdf/tools-charts-list/surface_preparation_standards.pdf) Only the SSPC designation is used here.
[b]The "Product Type" designation is intended to signify a change in the product tested

TABLE 5

Effect of disclosed microencapsulated healing agent in three-coat evaluations of zinc-rich primers.

| Syst. No. | Substrate Prep. (SSPC[a]) | Zinc Primer Chem. (Product Type[b]) | Zinc Primer Zinc Content (wt. %) | Disclosed Additive Loading | Second Coat | Third Coat | Scribe Width (μ) | Exp. Time (h) | Creep (mm) |
|---|---|---|---|---|---|---|---|---|---|
| 15 | SSPC-SP3 | Epoxy/Polyamide | 76% | — | Epoxy/Polyamide | Acrylic Aliphatic Polyurethane | 186 | 1000 | 11.9 |
| 16 | SSPC-SP3 | Epoxy/Polyamide | 76% | 4% | Epoxy/Polyamide | Acrylic Aliphatic Polyurethane | 186 | 1000 | 3.9 |
| 15 | SSPC-SP3 | Epoxy/Polyamide | 76% | — | Epoxy/Polyamide | Acrylic Aliphatic Polyurethane | 500 | 1000 | 13.5 |
| 16 | SSPC-SP3 | Epoxy/Polyamide | 76% | 4% | Epoxy/Polyamide | Acrylic Aliphatic Polyurethane | 500 | 1000 | 3.4 |
| 17 | SSPC-SP10 | Epoxy/Polyamide | 76% | — | Epoxy/Polyamide | Acrylic Aliphatic Polyurethane | 186 | 1000 | 8.6 |
| 18 | SSPC-SP10 | Epoxy/Polyamide | 76% | 4% | Epoxy/Polyamide | Acrylic Aliphatic Polyurethane | 186 | 1000 | 4.0 |
| 17 | SSPC-SP10 | Epoxy/Polyamide | 76% | — | Epoxy/Polyamide | Acrylic Aliphatic Polyurethane | 500 | 1000 | 8.1 |
| 18 | SSPC-SP10 | Epoxy/Polyamide | 76% | 4% | Epoxy/Polyamide | Acrylic Aliphatic Polyurethane | 500 | 1000 | 2.2 |

Note:
[a]The standard employed here for surface preparation is the result of the joint effort between the Society for Protective Coatings (SSPC) and the National Association of Corrosion Engineers (NACE) (https://protective.sherwin-williams.com/pdf/tools-charts-list/surface_preparation_standards.pdf) Only the SSPC designation is used here.

Coating Application

Figure 10A:
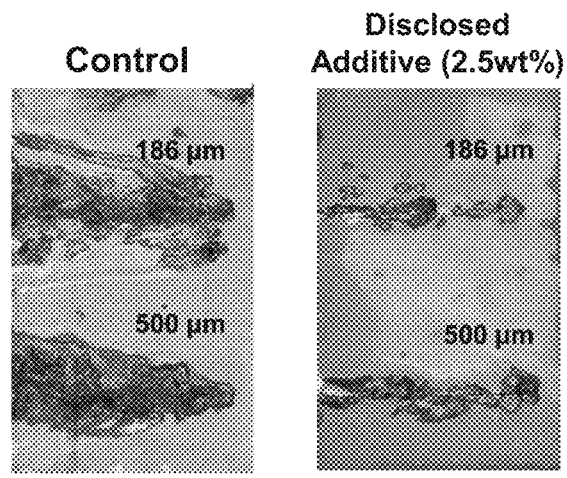
FIGS. 10A and 10B illustrate a comparison of a standard zinc rich primer (control) and the same primer containing 2.5 wt. % of the disclosed microencapsulated healing agent applied by airless spray gun (FIG. 10A) and gravity feed, conventional spray gun (FIG. 10B), with samples scribed using a 186-micron and a 500-micron scribe tool and exposed to a salt fog for 500 hours prior to taking the images, in accordance with various embodiments.
Figure 10B:
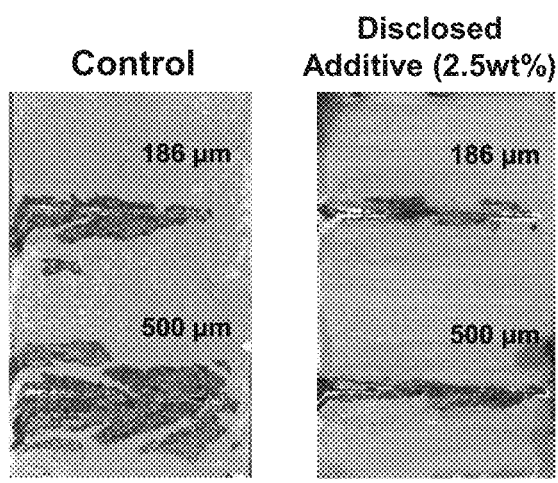

FIGS. 10A and 10B illustrate a comparison of a standard zinc rich primer (control) and the same primer containing 2.5 wt. % of the disclosed microencapsulated healing agent applied by airless spray gun (FIG. 10A) and gravity feed, conventional spray gun (FIG. 10B), with samples scribed using a 186-micron and a 500-micron scribe tool and exposed to a salt fog for 500 hours prior to taking the images, in accordance with various embodiments. The performance of zinc-rich coating formulations including the disclosed microencapsulated healing agent was compared to the corresponding control for formulations applied via a conventional, gravity feed application process as well as via an airless application process to assess the effect of the higher pressure airless application process on the microcapsules and the germane performance of the formulations into which they are incorporated. As shown in FIG. 10, it is evident that the application process had no effect on the performance of the coating applied. Furthermore, an analysis of the applied paint prior to curing exhibited no evidence of prematurely ruptured or destroyed capsules.

Coating System Simplification

Figure 11:
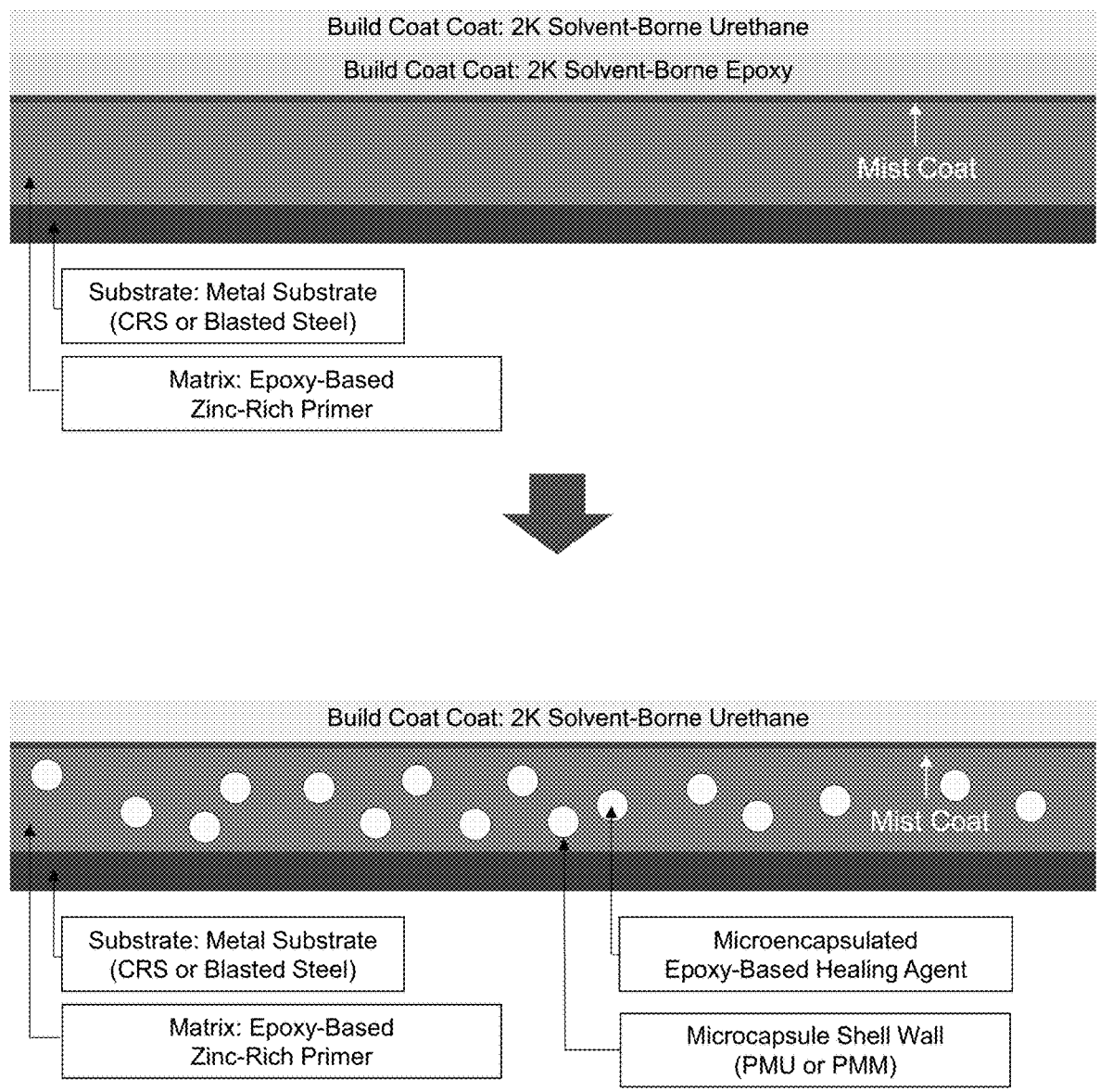
FIG. 11 illustrates a simplified coating system, wherein the improvement in the performance of the zinc-rich primer facilitates the simplification from a three-coat system to a two-coat system, in accordance with various embodiments.

FIG. 11 illustrates a simplified coating system, wherein the improvement in the performance of the zinc-rich primer facilitates the simplification from a three-coat system to a two-coat system, in accordance with various embodiments. The improved performance of zinc-rich primers afforded by the incorporation of the disclosed microencapsulated healing agent offers an opportunity for the simplification of coating systems in use today. In other words, the improved performance of the primer may allow for the elimination of an additional coat thereby facilitating the ability to turn a 4-coat system into a 3-coat system and a 3-coat system into a 2-coat system.

FIG. 11 illustrates the system simplification reported here in which 3-coat system, which includes a mist coat (typically not counted as a full coat) between the first and second coat is converted into a 2-coat system. The simplification of a coating system by eliminating layers in the system stack has the potential to unlock significant savings in the amount of material and labor expense associated with the application of the layer eliminated. Table 6 is a comparison of results obtained by comparing a coating system in which a urethane top-coat was applied directly over a zinc-rich primer following the application of a mist coat (2-coat system) to the standard 3-coat system. The results obtained after 1000 h of salt fog exposure validate the viability of this approach. The use of a more compatible top-coat will also likely decrease the need for the use of a mist coat prior to application of the top-coat.

TABLE 6

Effect of disclosed microencapsulated healing agent in converting three-coat systems into two coat systems

| Syst. No. | Substr. Prep. (SSPC[a]) | Zinc Primer Chem. | Zinc Primer Zinc Content (wt. %) | Discl. Additive Loading | Mist Coat | Second Coat | Third Coat | Scribe Width (μ) | Exp. Time (h) | Creep (mm) | Total DFT[b] |
|---|---|---|---|---|---|---|---|---|---|---|---|
| 17 | SSPC-SP10 | Epoxy/Polyamide | 83% | — | Epoxy/Polyamide | Epoxy/Polyamide | Acrylic Aliphatic Polyurethane | 500 | 1000 | 8.1 | 14-15 mils |
| 18 | SSPC-SP10 | Epoxy/Polyamide | 83% | 4% | Epoxy/Polyamide | Epoxy/Polyamide | Acrylic Aliphatic Polyurethane | 500 | 1000 | 2.2 | 14-15 mils |
| 19 | SSPC-SP10 | Epoxy/Polyamide | 83% | — | Epoxy/Polyamide | Acrylic Aliphatic Polyurethane | — | 500 | 1000 | 7.1 | 6-7 mils |
| 20 | SSPC-SP10 | Epoxy/Polyamide | 83% | 4% | Epoxy/Polyamide | Acrylic Aliphatic Polyurethane | — | 500 | 1000 | 2.8 | 6-7 mils |

Figure 12A:
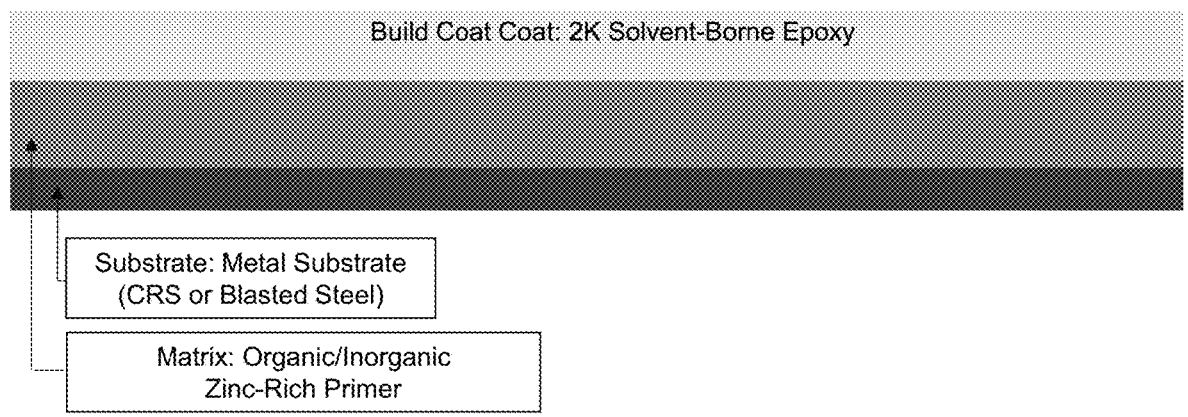
FIGS. 12A and 12B illustrate a comparison of systems evaluated for two-coat tests, including a standard organic zinc primer with an epoxy-based second layer (control.
Figure 12B:
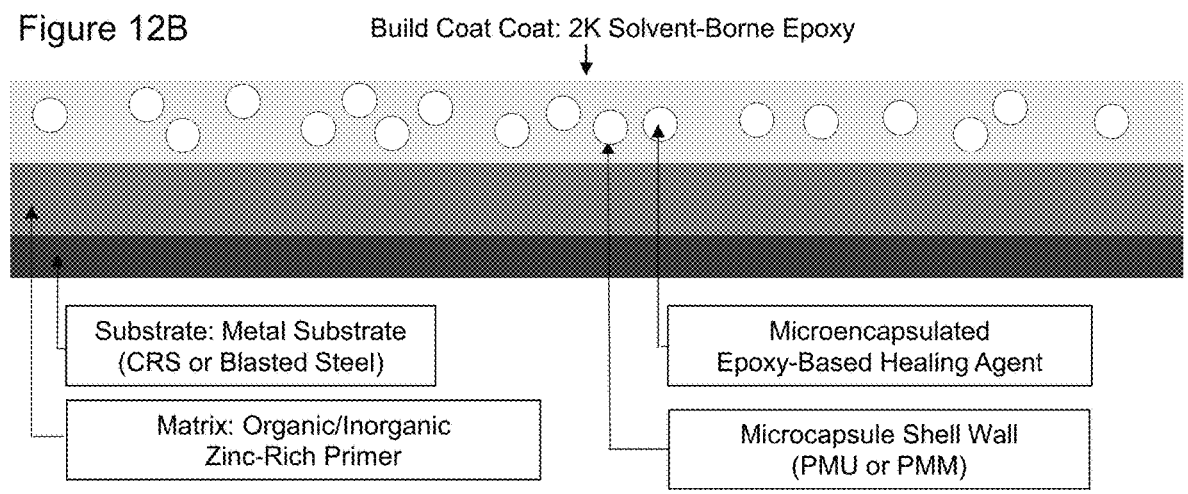

Note:
[a]The standard employed here for surface preparation is the result of the joint effort between the Society for Protective Coatings (SSPC) and the National Association of Corrosion Engineers (NACE) (https://protective.sherwin-williams.com/pdf/tools-charts-list/surface_preparation_standards.pdf) Only the SSPC designation is used here.
[b]DFT refers to the dry film thickness of the coating Performance in Coating Layers Adjacent to the Zinc-Rich Primer Layer FIGS. 12A and 12B illustrate a comparison of systems evaluated for two-coat tests, including a standard organic zinc primer with an epoxy-based second layer (control; FIG. 12A), and a standard organic zinc-rich primer with an epoxy-based second layer incorporating microencapsulated healing agent (FIG. 12B), in accordance with various embodiments. The disclosed microencapsulated healing agent has also been demonstrated to perform synergistically with a zinc-rich primer when it is incorporated in a layer directly above the zinc-rich primer layer.

An illustration of the two-coat option of this configuration incorporating the functionality of the disclosed microencapsulate healing agent is shown in FIG. 12. A three-coat system will simply incorporate a polyurethane top-coat. Damage to a coating system incorporating these configurations would rupture the capsules containing the disclosed healing agent formulation releasing it into the site of damage. In the site of damage, the curing disclosed healing agent formulation would exhibit the same interactions with the zinc-rich primer in the layer below as those described above for configurations in which the microencapsulated healing agent is incorporated directly into the zinc-rich primer. The healing agent can be cross-linked by residual curing agents it encounters in the layer in which it is incorporated and in the layer below while controlling the rate of oxidation as discussed above. Corrosion performance testing results for representative samples with this configuration of incorporation of the disclosed microencapsulated healing agent are summarized in Table 7.

TABLE 7

Performance of system containing disclosed microencapsulated healing agent in layer

| Syst. No. | Substr. Prep. (SSPC[a]) | Zinc Rich Primer Base Chem. | Second Coat | Loading of Discl. Additive in Second Coat | Third Coat | Scribe Width (μ) | Exp. Time (h) | Creep (mm) |
|---|---|---|---|---|---|---|---|---|
| 21 | SSPC-SP6 | Epoxy/Polyamide | Epoxy/Ketimine | — | Epoxy/Polyamide | 500 | 1000 | 9 |
| 22 | SSPC-SP6 | Epoxy/Polyamide | Epoxy/Ketimine | 5% | Epoxy/Polyamide | 500 | 1000 | 3.6 |
| 23 | SSPC-SP6 | Alkyl silicate | Epoxy/Polyamide | — | Epoxy/Polyamide | 500 | >5000 | 17 |
| 24 | SSPC-SP6 | Alkyl silicate | Epoxy/Polyamide | 5% | Epoxy/Polyamide | 500 | >5000 | 7.4 |

Note:
[a]The standard employed here for surface preparation is the result of the joint effort between the Society for Protective Coatings (SSPC) and the National Association of Corrosion Engineers (NACE) (https://protective.sherwin-williams.com/pdf/tools-charts-list/surface_preparation_standards.pdf) Only the SSPC designation is used here.

with either an epoxy-polyamide zinc-rich primer or an inorganic zinc-rich primer with an alkyl silicate binder. Note that an organic epoxy-amide mist coat was applied to the latter to eliminate inherent porosity, prior to applying the second coat. As such, the zinc-rich primer is likely more accurately described as an organic-inorganic hybrid with available residual curing agent to cross-link the epoxy resin included in the disclosed healing agent formulation.

EXAMPLES

Example 1. Microencapsulation of Disclosed and Comparative Healing Agent Formulations 200 mL of deionized H2O was measured into a clean 1000 mL container. 50 mL of a previously prepared solution of 5 wt % poly(ethylene-co-anhydride) (E400 EMA Copolymer) was added to the container. 5 g of urea, 0.5 g NH4Cl and 0.5 g of resorcinol (previously ground) were then added to the container and the solution was mixed until all the ingredients were completely dissolved. The pH of the solution was measured to be between 2.3 and 2.4 and it was adjusted to 3.5 by adding a 5 wt % solution of NaOH drop-wise. The container was then set up in a water bath on a programmable hot plate. A mixer blade or homogenizer was placed in the container and started to apply shear to the solution at a specified rate (2000 RPM for 25 micron capsules and 6000 RPM for 10 micron capsules). The emulsion particle size was measured using microscope to ensure that it was in the desired range. After 10 to 15 minutes of milling, 12.77 g of 37 wt % aqueous solution of formaldehyde was added to the container. 10 to 15 drops of octanol was added at regular intervals to prevent foaming. The hot plate was started to increase the temperature of the reaction mixture to 55° C. at a rate of 1° C./min (60° C./h). The timer was then set for 4 hours. After the completion of the reaction, the reaction mixture was cooled to room temperature before beginning the isolation process of the capsules. The reaction mixture was washed thoroughly to remove excess surfactant and any unreacted ingredients. Washed capsules were re-slurried with deionized water and spray-dried to obtain microcapsules in dry powder form.

Example 2. Incorporation of Spray-Dried Capsules into Coating (4 Wt. %) into Coating Already Containing Zinc For the incorporation of 4 wt % dried microcapsules (microencapsulated disclosed or comparative healing agent) into a zinc-rich primer, the prescribed amount of microcapsules (4 g) was first added to half of the epoxy base component of a two-part epoxy zinc-rich primer (44.5 g), which already contained the zinc powder. The mixture was gently blended with a paddle mixer at a medium speed (about 800-1000 RPM) for 60 seconds. The other half of the base component (44.5 g) was then added followed by mixing as already described. Finally, 7 g of curing agent component was then added the base blend containing capsules followed by mixing for 60 seconds prior to application on the target substrate.

Example 3. Incorporation of Spray-Dried Capsules into Coating (4 wt. %) into Coating Already Containing Zinc For the incorporation of 4 wt % dried microcapsules into a second zinc-rich primer coating, the prescribed amount of microcapsules (4 g) was first added to half of the epoxy base component, which already contained the zinc powder. The mixture was gently blended with a paddle mixer (at a medium speed (about 800-1000 RPM) for 60 seconds. The other half of the base component (45.6 g) was then added followed by mixing as described above. Finally, 4.8 g of the curing agent component, was added to the base blend containing capsules followed by mixing for 60 seconds prior to application on the target substrate.

Example 4. Incorporation of Spray-Dried Capsules (4 wt. %) and Zinc Powder into Coating For some epoxy zinc formulations, the zinc powder was packaged separately from the remaining the two-part coating for formulation. For these examples, half of the total amount of the base component of the coating was first added into a container followed by the required amount of microcapsules. The resulting combination was then thoroughly blended using a paddle mixer for 60 seconds. The zinc powder was then added periodically at roughly 10% portions while mixing until a thick but homogenous mixture was achieved. The second half of the base component was then added and the blend was mixed for an additional 60 seconds. Any remaining zinc powder was added at the same rate previously discussed until all the zinc is incorporated. In some cases, a thinner (1 wt. %) was needed facilitate full wet out of all the zinc powder. The resulting base formulation was blended for 60 to 120 seconds prior to adding the first half of the curing agent component. The mixture was then blended for an additional 60 to 120 seconds prior to adding the second half of the curing agent component. The resulting formulation was blended for an additional 60 to 120 seconds prior to application on the target substrate.

Example 5. Substrate Preparation

SSPC-SP3 steel substrates were prepared by abrading suing an 80-grit belt sander in four directions. The substrates were then cleaned with acetone using a lint free cloth. Compressed air was then applied over the substrate to remove any remaining dust particles. SSPC-SP6 and SSPC-SP10 substrates were acquired already blasted. These substrates were simply cleaned using acetone and a lint free cloth. Compressed air was then applied over the substrate to remove and remaining dust particles.

Example 6. Coating Application, Scribing and Testing

The zinc-rich primers were applied via a gravity feed conventional spray gun with a 1.8 mm nozzle and 60 psi air pressure. In cases where additional coats were applied, they were applied via pressure pot conventional spray with a 2.2 mm nozzle and 60 psi of air pressure for epoxy build coats and via a gravity feed conventional spray gun for polyurethane top coats. In general, tested coating systems, whether one-coat, two-coat or three-coat were allowed to cure for 7 days prior to damage. Damage to the coating was accomplished by scribing using 186-micron and 500-micron scribe tools as shown in FIG. 2. After scribing, the samples were allowed to equilibrate at room temperature for 24 h prior to exposure to the salt fog.

The capsules may be an average of 25 microns in average diameter or less. Where the capsules are incorporated into a zinc-rich coating, the zinc-rich coating maintains its efficiency of connectivity between the zinc particles and between the zinc particles and the underlying metal substrate. Incorporation of the capsules into a zinc-rich coating improves the barrier property of the coating Incorporation of the capsules described in "a" above has a negligible effect on the connectivity of the zinc particles for capsule average sizes of 25 microns or less and loading rates of 4 wt. % or less. The coating or coating system incorporating the capsules described in "a" above, exhibits improvements in adhesion maintenance and corrosion resistance after damage that exposes the underlying substrate. The coating or coating system incorporating the capsules described in "a" above, exhibits improvements in adhesion maintenance and corrosion resistance after damage on blasted steel surfaces as well as lightly abraded cold-rolled steel and other poorly prepared metal substrates.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A zinc-rich coating system, comprising:
   a zinc-rich primer comprising a plurality of zinc pigment particles; and
   a microcapsule having
      a polymeric shell wall; and
      a core formulation comprising an epoxy resin, a hydrophobic polar aprotic solvent, and a glycidylalkoxysilane,
   wherein a pigment volume concentration (PVC) of the zinc pigment particles is equal to or greater than a critical pigment volume concentration (CPVC) of the zinc pigment particles.

2. The zinc-rich coating system of claim 1, wherein the zinc-rich primer comprises an organic binder.

3. The zinc-rich coating system of claim 2, wherein the organic binder comprises an epoxy resin cured by an amine, a polyamine, an anhydride, an aminosiloxane, an imidazole, a polyamide, a ketamine, a ketimine, a modified amine that is a reaction product of an amine and another compound, a mercaptan, a polymercaptan, a polysulfide, a thiol, a boron trifluoride-amine complex, an organic acid hydrazide, a photo or ultraviolet curing agent, or a combination thereof.

4. The zinc-rich coating system of claim 1, wherein the zinc-rich primer comprises an inorganic binder.

5. The zinc-rich coating system of claim 4, wherein the inorganic binder comprises a moisture-cured alkyl silicate binder, moisture-cured oligomeric alkyl silicate binder, or an acid or base catalyzed moisture-cured oligomeric alkyl silicate binder.

6. The zinc-rich coating system of claim 1, wherein the zinc-rich primer exhibits an improvement in adhesion maintenance and/or corrosion resistance after damage that exposes an underlying substrate.

7. The zinc-rich coating system of claim 1, wherein the zinc-rich primer exhibits an improvement in adhesion maintenance and/or corrosion resistance after damage on a blasted steel surface, a lightly abraded cold-rolled steel surface, or other non-abraded, minimally abraded, or irregularly abraded steel surfaces.

8. The zinc-rich coating system of claim 1, wherein the coating system comprises:
   a first coating layer comprising the zinc-rich primer; and
   a second coating layer comprising the microcapsule, wherein the second layer excludes zinc, and wherein the second coating layer directly contacts the first coating layer.

9. The zinc-rich coating system of claim 8, wherein the second coating layer comprises an organic binder comprising an amine-cured, polyamine-cured, or polyimide-cured epoxy resin.

10. The zinc-rich coating system of claim 8, wherein the first coating layer is mist-coated with an organic coating, and wherein the mist coating comprises a binder comprising an amine cured, polyamine-cured, or polyimide-cured epoxy resin.

11. The zinc-rich coating system of claim 8, wherein the coating system exhibits an improvement in adhesion maintenance and/or corrosion resistance after damage that exposes an underlying substrate.

12. The zinc-rich coating system of claim 8, wherein the coating system exhibits an improvement in adhesion maintenance and/or corrosion resistance after damage on a blasted steel surface, a lightly abraded cold-rolled steel surface, or other non-abraded, minimally abraded or irregularly abraded steel surfaces.

13. The zinc-rich coating system of claim 1, wherein the coating system comprises:
   a first coating layer comprising the zinc-rich primer; and
   a second coating layer comprising an organic epoxy coating comprising the microcapsule.

14. The zinc-rich coating system of claim 13, wherein the first coating layer is mist-coated with a third coating layer comprising an organic coating prior to application of the second coating layer, and wherein the third coating layer comprises a binder comprising an amine-cured, polyamine-cured, or polyimide-cured epoxy resin.

15. The zinc-rich coating system of claim 1, wherein the polymeric shell wall comprises urea-formaldehyde, melamine-formaldehyde, polyacrylate, polyurea, or polyurethane.

16. The zinc-rich coating system of claim 1, wherein the glycidylalkoxysilane comprises (3-glycidyloxypropyl)trimethoxysilane.

17. The zinc-rich coating system of claim 1, wherein the microcapsule has an average diameter of 25 microns or less.

18. The zinc-rich coating system of claim 1, wherein incorporation of a plurality of the microcapsules into the zinc-rich coating system allows the zinc-rich coating system to maintain its efficiency of connectivity between the zinc pigment particles and between the zinc pigment particles and an underlying metal substrate.

19. The zinc-rich coating system of claim 18, wherein incorporation of a plurality of the microcapsules into the zinc-rich coating system improves a barrier property of a portion of the zinc-rich coating system adjacent to a damage site that exposes an underlying substrate.

\* \* \* \* \*